United States Patent [19]

Fujimura et al.

[11] Patent Number: 5,167,911
[45] Date of Patent: Dec. 1, 1992

[54] FUEL ASSEMBLY AND BOILING WATER REACTOR

[75] Inventors: Koji Fujimura, Hitachi; Yasunori Bessho, Mito; Yoshihiko Ishii, Hitachioota; Sadao Uchikawa, Katsuta; Yuichiro Yoshimoto, Hitachi; Junjiro Nakajima, Hitachi, all of Japan

[73] Assignee: Hitachi, Ltd., Tokyo, Japan

[21] Appl. No.: 669,376

[22] Filed: Mar. 14, 1991

[30] Foreign Application Priority Data

Mar. 15, 1990 [JP] Japan .................. 2-64794

[51] Int. Cl.$^5$ .............................................. G21C 3/34
[52] U.S. Cl. ................................. 376/440; 376/443; 376/444; 376/439
[58] Field of Search ............... 376/443, 444, 439, 445, 376/440; 976/DIG. 136

[56] References Cited

U.S. PATENT DOCUMENTS

| | | | |
|---|---|---|---|
| 4,035,233 | 7/1977 | Williamson et al. | 376/440 |
| 4,863,680 | 9/1989 | Sakurada et al. | 376/444 |
| 4,970,047 | 11/1990 | Ueda et al. | 376/443 |
| 4,997,621 | 3/1991 | Johansson et al. | 376/444 |

FOREIGN PATENT DOCUMENTS

205162 12/1986 European Pat. Off. .
282600 9/1988 European Pat. Off. .

Primary Examiner—Brooks H. Hunt
Assistant Examiner—Meena Chelliah
Attorney, Agent, or Firm—Antonelli, Terry, Stout & Kraus

[57] ABSTRACT

A fuel assembly comprises a plurality of fuel rods which contain nuclear fuel material inside, a lower tie plate which holds the lower end of the fuel rods and has a path inside to lead coolant between the fuel rods, and a channel box which encloses a bundle of the fuel rods. An orifice, in which a plurality of round rods are arranged to cross the coolant flow path, is installed in a through hole at a side wall of the lower tie plate by connecting to the side wall. Orifice coefficient of the orifice becomes large at small flow rate of coolant which supplied to the fuel assembly, and becomes small at large flow rate of coolant. By using the fuel assembly described above, void fraction in a gap region between fuel assemblies can be altered during beginning and end of an operation cycle of the nuclear reactor.

15 Claims, 11 Drawing Sheets

FUEL ASSEMBLY AND BOILING WATER REACTOR

BACKGROUND OF THE INVENTION

The present invention relates to a fuel assembly and a nuclear reactor, especially, to a fuel assembly to be loaded into a boiling water reactor, a lower tie plate of the fuel assembly, a reactor core composed of the fuel assembly, and the boiling water reactor.

In the boiling water reactor, a plurality of fuel assemblies are loaded into a reactor core which is located in the middle of a pressure vessel, and a plurality of cross shaped control rods, of which insertion are regulated by an apparatus of control rod drive, are installed between the fuel assemblies.

Exothermic reaction in a nuclear reactor is maintained by chain reactions of nuclear fission. That is, in the nuclear reactor, a thermal neutron collides with uranium and causes a fission. Kinetic energy of a fission fragment of the uranium is converted mainly to thermal energy. Further, two or three fast neutrons are generated by the fission of uranium. The fast neutron collides with hydrogen atoms in moderator (light water of coolant in the boiling water reactor) several times and is moderated to thermal equilibrium state with atoms composing of the reactor core, and causes next fission of uranium. Subsequently, uranium continues burning by the chain reaction. The reaction is called a nuclear fission. Collision of the uranium with the neutron does not always cause the nuclear fission. Among uranium isotopes existing naturally, the isotope which causes the nuclear fission by collision with the neutron is uranium-235. Isotopic composition ratio of the uranium-235 is about 0.7%, and the rest is uranium-238 which does not cause nuclear fission reaction. Therefore, main commercial nuclear reactors are using enriched uranium, wherein uranium-235 is enriched, as a fuel material.

In a conventional boiling water reactor, a cross-shaped control rod is used to regulate the chain reaction of the nuclear fission by insertion between the fuel assemblies. The control rod contains $B_4C$, an absorbing material of neutron. By changing the insertion rate of the control rod into the reactor core, absorption of neutron by the control rod is regulated and the nuclear fission reaction is controlled. Especially, to maintain a scheduled reactivity all through an operation cycle to end of the operation cycle, the fuel material has high reactivity latently at beginning of the operation cycle. In addition to difference of reactivity between at reactor operation and at reactor cold shut down, the high reactivity has possibility to reduce reactor cold shut down margin. Therefore, in view of regulation of excess reactivity at the beginning of the operation cycle and certain holding of the reactor shut down margin, a method to mix a burnable poison such as gadolinia etc. with the fuel material for regulation of reactivity has been adopted in addition to the regulation of reactivity by using control rods.

Further, as another method to regulate the excess reactivity, a method to vary fraction of steam volume in the reactor core (hereinafter called void fraction) is provided. For example, the void fraction in the reactor core is changed by alteration of flow rate of coolant in the reactor core. The change of the void fraction causes variation of moderating effect of the neutron by hydrogen atoms in the moderator and, consequently, variation of reactivity. Accordingly, a method to change void fraction can be utilized for regulation of the reactivity of the reactor core. The void fraction is generally changeable to be large at beginning of the operation cycle and small at end of the cycle. Such change of the void fraction makes harder of neutron spectrum at beginning of the operation cycle than the neutron spectrum at end of the operation cycle, and consequently yield of plutonium as a fissile material is increased. The increasing of yield of plutonium means increment of fissile material in the reactor core, and it makes possible to extend operation period of the nuclear reactor. A method of operation to alter neutron spectrum during the operation cycle so as to extend the operation period is called "spectral shift operation".

Methods of the spectral shift operation based on alteration of ratio of hydrogen to uranium (H/U ratio) during the operation cycle are disclosed in JP-A-57-125390 (1982) (U.S. application Ser. No. 217,275, filing date; Dec. 16, 1980), and JP-A-57-125391 (1982) (U.S. application Ser. No. 217,061, filing date; Dec. 16, 1980).

Publications described above are indicating that the spectral shift operation is performed with using a water displacer rod which is installed separately in addition to a control rod. That is, the water displacer rod is inserted into a fuel assembly to decrease the H/U ratio at beginning of an operation cycle, and the water displacer rod is withdrawn from the fuel assembly to increase the H/U ratio at end of the operation cycle. At the beginning of the operation cycle when the H/U ratio is small, yield of fissile plutonium is increased as same as the case of the large void fraction.

The prior art described above necessitates a driving apparatus to handle the water displacer rod separately in addition to a control rod driving apparatus to handle the control rod, and consequently structure of the nuclear reactor becomes complex. A plurality of water displacer rods are installed instead of only one rod.

A fuel assembly with which the spectral shift operation is possible by altering void fraction in the fuel assembly is disclosed in EP-A-0205162. The fuel assembly has an orifice having a plurality of round rods which are installed in a way to cross a coolant path at inside of a lower tie plate.

JP-A-57-125390 (1982) and JP-A-57-125391 (1982) indicate a spectral shift operation of a pressurized water reactor, while EP-A-0205162 indicates a spectral shift operation of a boiling water reactor. EP-A-0205162 describes a structure installing the orifice at a coolant path inside of fuel support fittings which support the fuel assembly as another example.

JP-A-60-177293 (1985) discloses a structure to perform the spectral shift operation by altering void fraction in a gap (hereinafter called water gap region) which is formed between each of loaded fuel assemblies in a reactor core of a boiling water reactor, concretely saying, water gap region which is formed between channel boxes of each fuel assembly. Coolant flows in the water gap region as well as in the fuel assembly. The coolant is leaked into the water gap region from a gap between a lower tie plate of the fuel assembly and the channel box, between the lower tie plate and a fuel support fitting, and between the fuel support fitting and a reactor core support plate, and so on. In JP-A-60-177293 (1985), a through hole connecting to the water gap region is provided at the reactor core support plate, and further a flow regulating valve is installed at the reactor core support plate to alter the void fraction in the water gap region. The flow regulating valve regulates the flow rate of the coolant from the through hole to the water gap region. That is, the valve disc of the flow regulating valve closes the through hole by action of a spring which is attached to the valve. The condition described above is caused at a case when flow rate of the coolant to the fuel assembly is small. When the flow rate of the coolant is increased, the valve disc moves upward to open the hole and coolant is provided to the water gap region through the hole. At beginning of an operation cycle, the through hole is closed by the valve disc and void fraction in the water gap region is increased. At end of the operation cycle, the through hole is opened and the void fraction in the water gap region is decreased. Effect of the spectral shift operation is larger when void fraction outside of the fuel assembly, namely void fraction in the water gap region, is altered than a case when void fraction in side of the fuel assembly is altered.

The method disclosed in JP-A-60-177293 uses a simpler structure than other prior art which uses water displacer rod. However, the flow regulating valve which is disclosed in JP-A-60-177293 uses recovering power of a spring and causes a problem that the spring loses its recovering power as a result of neutron irradiation.

SUMMARY OF THE INVENTION

The object of the present invention is to provide a fuel assembly and a boiling water reactor which are able to regulate void fraction in a gap being formed between fuel assemblies without using mobile members.

Another object of the present invention is to provide a fuel assembly which is able to increase thermal margin at beginning of an operation cycle.

The present invention is characterized in providing a through hole on a side wall of the lower tie plate, through which a portion of the effective current leak out, and installing a resistant means, of which the pressure loss coefficient depends on the flow velocity of the coolant passing through the hole of the lower tie plate.

DETAILED DESCRIPTION OF THE PREFERRED EMBODIMENTS

Before describing embodiments of the present invention, an outline of spectral shift operation by altering void fraction is explained hereinafter.

Figure 1:
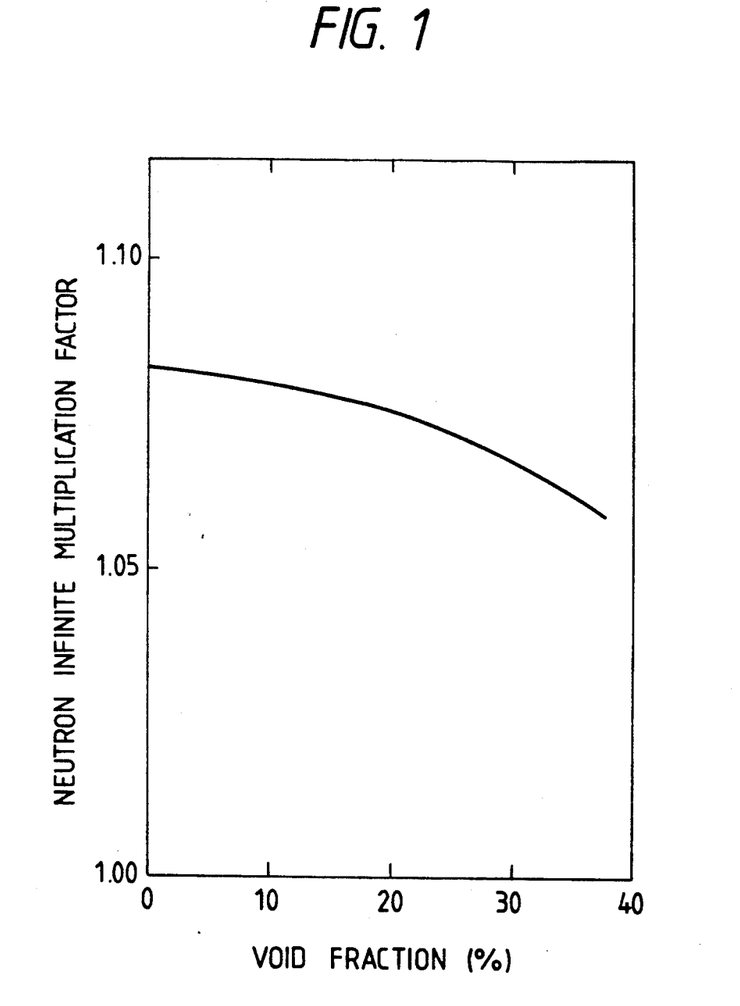
FIG. 1 is a graphical representation for explanation of a relation between neutron infinite multiplication factor and void fraction in a boiling water reactor.

A relation of neutron infinite multiplication factor and void fraction at beginning of life (0 GWd/t) of a fuel assembly which is using in a typical boiling water reactor is shown in FIG. 1. According to FIG. 1, it is revealed that the less void fraction, the larger is neutron infinite multiplication factor. When flow rate in a reactor core (flow rate of cooling water supplied to the fuel assembly) is increased, void fraction in the reactor core is decreased, and moderating effect of neutron is enhanced. Consequently, neutron infinite multiplication factor is raised and reactivity of the reactor core is increased.

Figure 2A:
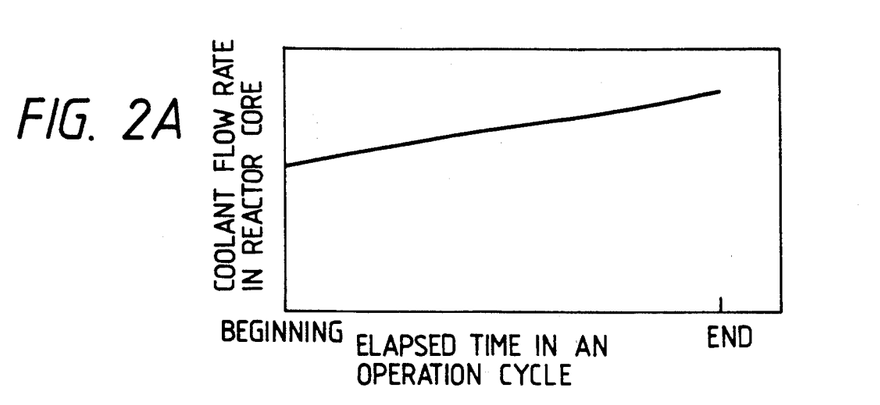
FIGS. 2A, 2B and 2C are graphical representations for explanation to indicate effects of spectral shift operation by flow regulation in the reactor core.
Figure 2B:
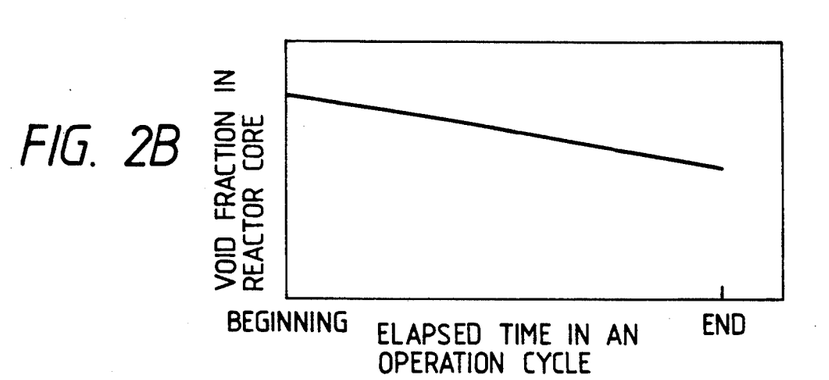
Figure 2C:
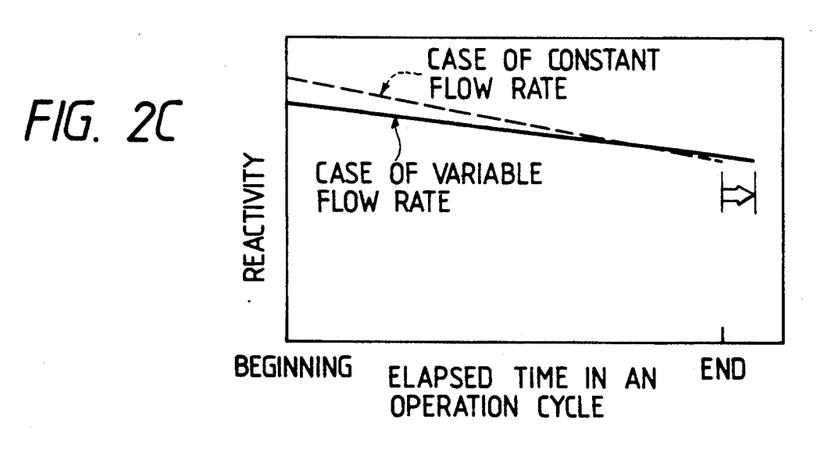

A method of operation to regulate the reactivity by altering void fraction is shown in FIGS. 2A~2C. The axis of abscissa of the figures are representing elapsed time in an operation cycle. The axis of ordinate is representing flow rate in the reactor core in FIG. 2A, void fraction in the reactor core in FIG. 2B, and reactivity in FIG. 2C, respectively.

As shown in FIG. 2A, the flow rate in the reactor core is regulated to be small at beginning of an operation cycle and to be large at end of the operation cycle. It makes void fraction larger as shown in FIG. 2B and reactivity larger as shown in FIG. 2C with decreasing of the flow rate in the reactor core at the beginning of the operation cycle when excess reactivity exists. And at the beginning of the operation cycle, neutron spectrum in the reactor core is hardened, and probability of neutron resonance absorption by uranium 238 is increased, and hence, yield of fissile plutonium 239 is enhanced. As increasing of flow rate in the reactor core at the end of the operation cycle enhances nuclear fission reaction of plutonium 239 which has been yielded at first half of the operation cycle and reactivity at the end of the operation cycle is increased, operation period of the nuclear reactor (burn up) can be extended longer than a case in which flow rate in a reactor core is not performed as shown in FIG. 2C.

Embodiments of the present invention used the principle described above, and altered the void fraction in a water gap region which was formed between fuel assemblies. The embodiments of the present invention are explained hereinafter with using figures.

EMBODIMENT 1

A fuel assembly which is a preferred embodiment of the present invention is explained with using FIGS. 3~5, 6A and 6B.

Figure 3:
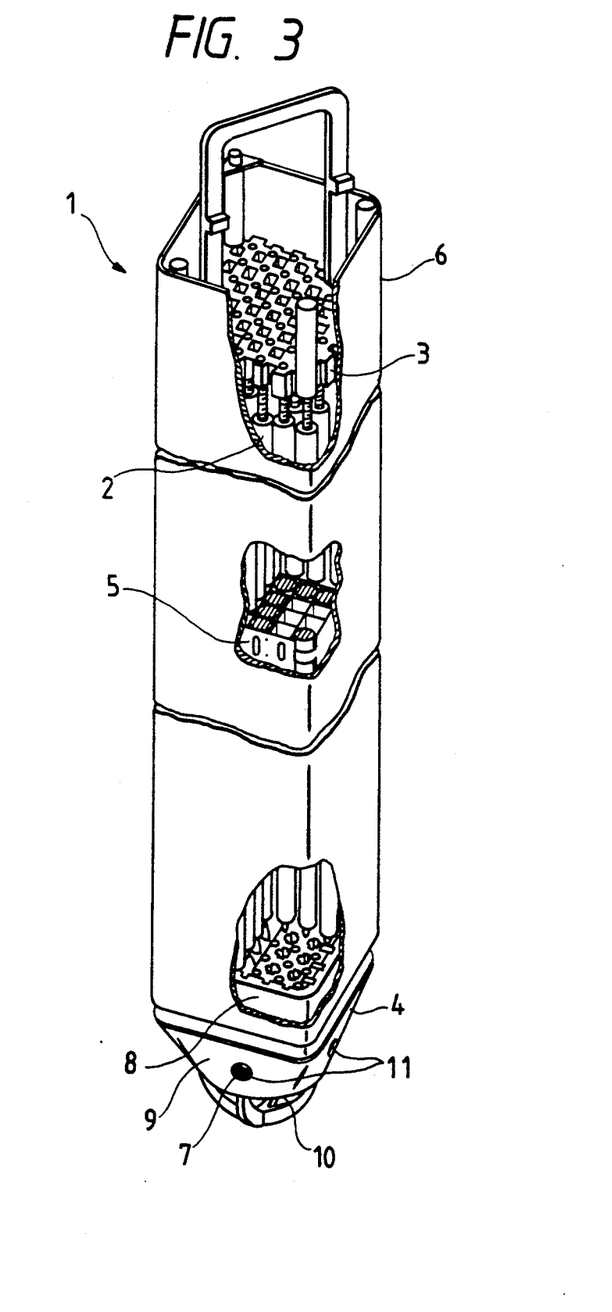
FIG. 3, is a partially cutaway perspective view of a fuel assembly relating to the first embodiment of the present invention.

A fuel assembly 1 of the present invention comprises a plurality of fuel rods 2, an upper tie plate 3 and a lower tie plate 4 which hold of an upper end portion and lower end portion of the fuel rod 2 by insertion of an upper end plug and lower end plug of the fuel rod 2, each of which is installed at upper and lower portions of the fuel rod respectively, a spacer to maintain the distance between the fuel rods 2 each other, and a channel box 6 which encloses members described above.

Figure 5:
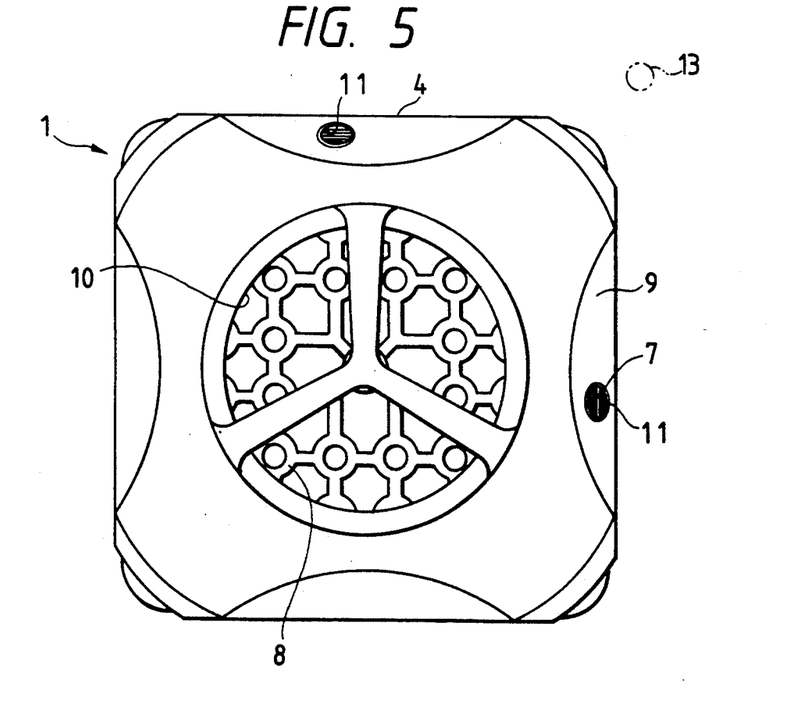
FIG. 5 is a view of a lower tie plate in FIG. 3 seen upwards from the bottom of the fuel assembly.

The lower tie plate 4 comprises a fuel supporting portion 8 to support lower end portion of the fuel rod 2 and a side wall 9 which tapers downward from a periphery of the fuel supporting portion 8 and shapes a square having a space inside. At lower end portion of the side wall 9, a nozzle portion 10 is opened as shown in FIG. 5. Through holes 7 are provided on adjacent two sides of four sides of the side wall 9. In the through holes 7, orifices 11 of which the pressure loss coefficient depends on the flow velocity of passing coolant are installed. The orifices 11 are disclosed in FIGS. 6A and 6B in EP-A-0205162 etc.

Figures 6A, 6B, 7:
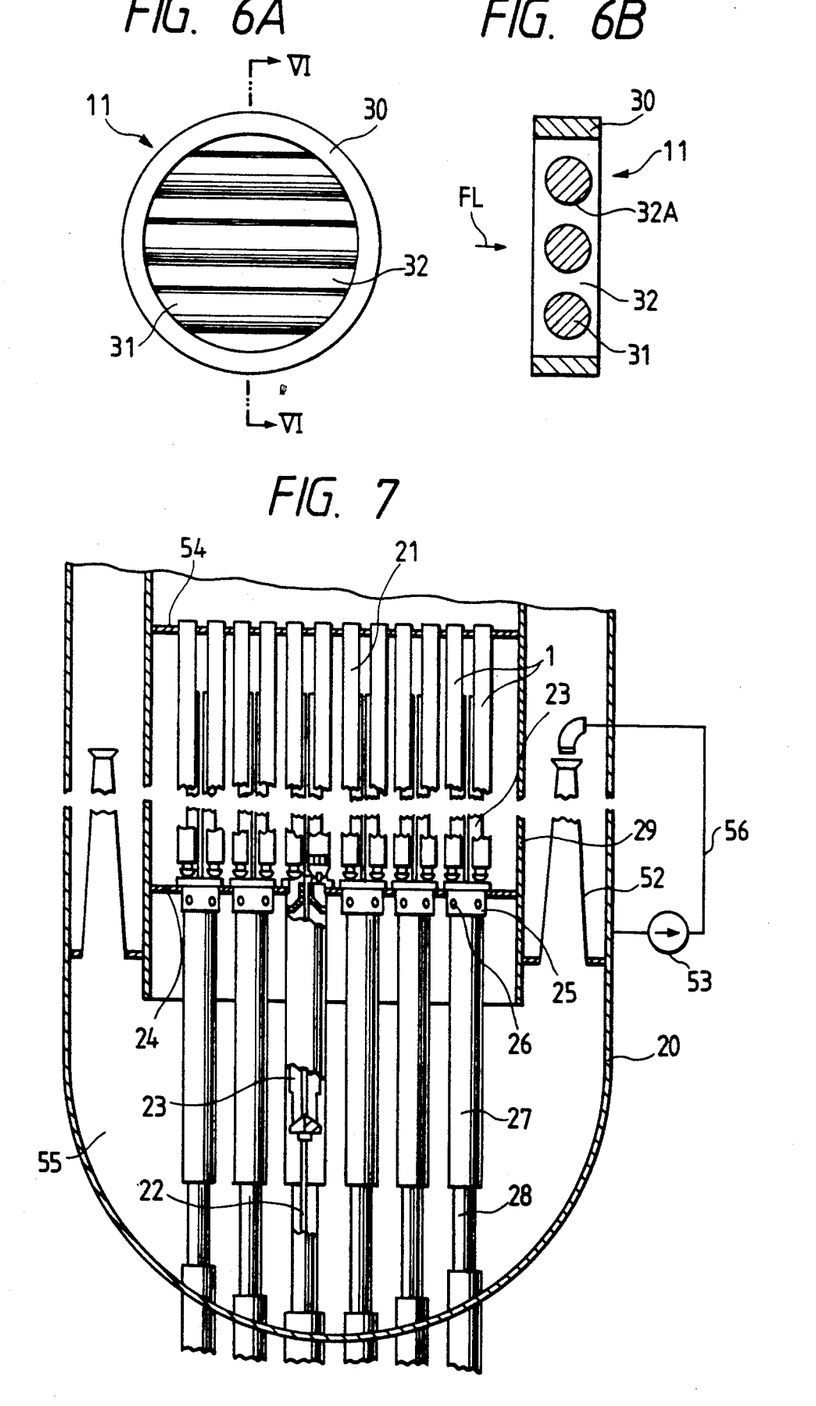
FIG. 6A is a front view of the orifice 11 shown in FIG. 3.
FIG. 6B is a sectional view at VI—VI section of the orifice in FIG. 6A.
FIG. 7 is a partial vertical sectional view of a boiling water reactor which is loaded with the fuel assemblies shown in FIG. 3.

The variable orifice 11 is a ring 30 having three round rods 31 which are arranged in parallel with gaps 32 each other and are welded at both ends to the ring 30, and coolant flows through the gap 32. Cross sectional shape of each of gaps 32, namely each of coolant path, along a direction of an arrow FL is such that cross sectional area is decreasing gradually along the flow of coolant in the upper stream side of the narrowest throat portion 32A and the cross sectional area is increasing gradually along the flow of coolant in the lower stream side of the narrowest throat portion 32A, and walls of both sides (surface of the round rod 31) to form the gap 32 have a continuous plane without corners. Shape of the gap 32 along axial direction of the round rod 31, especially shape at the throat portion 32A is a long and narrow rectangular which is defined by side shape of axial direction of a pair of the round rods 31 which face each other.

A structure of a boiling water reactor which is loaded with fuel assemblies 1 is shown in FIG. 7. The boiling water reactor comprises a pressure vessel for a nuclear reactor 20, a reactor core support plate 24, and the fuel assemblies 1. A reactor core shroud 29 is located inside of the pressure vessel for the nuclear reactor 20 and fixed to the pressure vessel for the nuclear reactor 20. Jet pumps 52 are installed between the pressure vessel for the nuclear reactor 20 and the reactor core shroud 29. The reactor core support plate 24 is installed at the lower end portion of the reactor core shroud 29, and is located inside of the reactor core shroud 29. A plurality of fuel support fittings 25 are installed at the reactor core support plate 24 in a state of through the reactor core support plate 24.

A plurality of the fuel assemblies 1, which are arranged in the reactor shroud 29 where four of the fuel assemblies are treated as a unit, are supported by insertion of each of the lower tie plate 4 into each of outlet through hole portion of four cooling water paths (not shown in the figure) which are provided in the fuel support fittings 25 respectively. A number 26 indicates an entrance of cooling water of the cooling water path. The upper end portion of the fuel assembly 1 is supported by an upper grid plate 54 which is installed in the reactor core shroud 29. The reactor core is a portion in the reactor core shroud 29 where the fuel assemblies 1 are arranged. A lower plenum 55 is formed in the pressure vessel for the nuclear reactor 20 beneath the reactor core support plate 24. In the lower plenum 55, a plurality of control rod guide tubes 27 are installed. A housing of an apparatus for control rod drive 28 is connected to lower end of the control rod guide tube 27, and extends downwards through the pressure vessel for the nuclear reactor 20. A cross shaped control rod 23 moves up and down in the control guide tube 27, and is inserted into or withdrawn from a space between the fuel assemblies 1 in the reactor core through a through hole (not shown in the figure, separated from the four cooling water paths) in the fuel support fittings 25. The control rod 23 is operated with the apparatus for control rod drive 22 which is installed in the housing of the apparatus for control rod drive 27. A number 53 indicates a recycling pump which is installed at a piping of recycling system 56.

Figure 4:
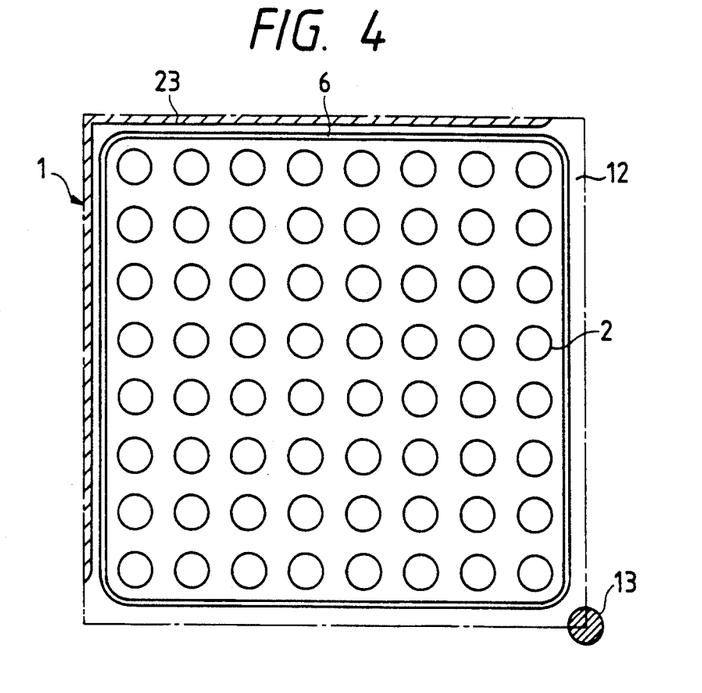
FIG. 4 is a horizontal sectional illustration of the fuel assembly shown in FIG. 3.

Around the fuel assemblies 1 in the reactor core 21, a water gap region 12 is formed as shown by chain line in FIG. 4. Coolant which is supplied to the reactor core is separated by the channel box into an effective current, which cools the inside of the fuel assembly 1, namely the fuel rods 2 in the channel box 6, and a leak current which flows through the water gap region 12 and does not cool the fuel rods 2. In the present embodiment, the ratio of the cross sectional area of the water gap region 12 to the cross sectional area of the flow path of the coolant in the fuel assembly 1 (in the channel box 6) is about 32%.

An in-core instrumentation tube 13 is installed in the water gap region 12 at a portion of opposite side to a side where the control rod 23 is inserted. In the boiling water reactor of prior art, a leakage hole to leak a portion of the effective current to the water gap region 12 is provided in each of two sides where the in-core instrumentation tube 13 is located (right side and lower side in FIG. 4) respectively, out of four sides of the lower tie plate 4 in view of heat removal of the in-core instrumentation tube 13. In the present embodiment, an orifice 11 is installed at a location where the leakage hole has been provided.

Figure 8:
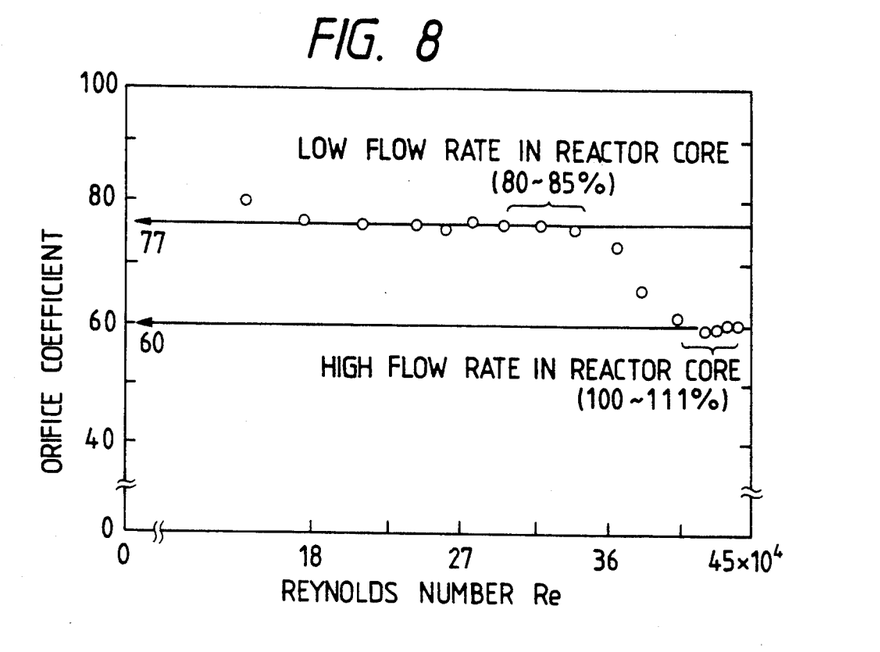
FIG. 8 is a characteristic graph to indicate dependency of orifice coefficient of the orifice 11 on Reynolds Number.

The orifice has a characteristics shown in FIG. 8. The characteristics shown in FIG. 8 is an observed example of dependance of orifice coefficient $K_{or}$ of the orifice 11 on Reynolds Number (Re). According to the FIG. 8, $K_{or} \approx 77$ in the range of $Re = (13 \sim 4) \times 10^4$, and $K_{or} \approx 60$ in the range of $Re = (44 \sim 45) \times 10^4$, and consequently, it is revealed that the orifice coefficient can be variable approximately 22%. In the example, a close range of $Re = 34 \times 10^4$ corresponds to about 80~85% of flow rate of the reactor core, and a close range of $Re = 44 \times 10^4$ corresponds to about 100~110% of flow rate of the reactor core respectively.

A reason to cause such characteristics is indicated in description of from line 25, page 11 to line 5, page 14 in the specification of EP-A-0205162, and FIGS. 9 and 10 of same. That is, when coolant flows through the gap 32, the round rod 31 acts as a resistant member, and a boundary layer is formed on the surface of the round rod 31.

The boundary layer is separated from the surface of the round rod 31 at down stream side of the gap 32. Separation point of the boundary layer and width of separation area at down stream side of the separation point are changed depending on the flow velocity of coolant flowing through the gap 32. While, the separation area causes pressure loss. The orifice 11 has a function to change a pressure loss coefficient (the orifice coefficient $K_{or}$) depending on Reynolds Number by using separation phenomenon of the boundary layer which is formed on the surface of the round rod 31 by flowing liquid through the gap 32.

As described above, the orifice 11 having a plurality of round rods 31 does not have mobile members, and yet the orifice coefficient decreases as the flow rate increases, that is, the orifice has a function to lessen the pressure loss as the flow rate increases. Further, various modification is possible on the orifice 11 as indicated in FIGS. 11A~11F of EP-A-0205162.

Starting up of the boiling water reactor is performed as described below.

The boiling water reactor which has reached a critical condition by withdrawing of control rods 23 from the reactor core 21 is performed an operation to raise temperature and pressure with further withdrawing of control rods 23. At the time, coolant is supplied to the reactor core 21. The supply of the coolant is performed by operation of the recycle pump 53 and ejection of the coolant from a nozzle into the jet pump 52. The ejected coolant sucks coolant existing between the pressure vessel for the nuclear reactor 20 and the reactor core shroud 29 into the jet pump 52. The coolant which is flowed out from the jet pump 52 is supplied to inside of the fuel assembly 1 through lower plenum 55, coolant path of the fuel support fittings 25, and outlet through hole of the coolant path.

Figure 9:
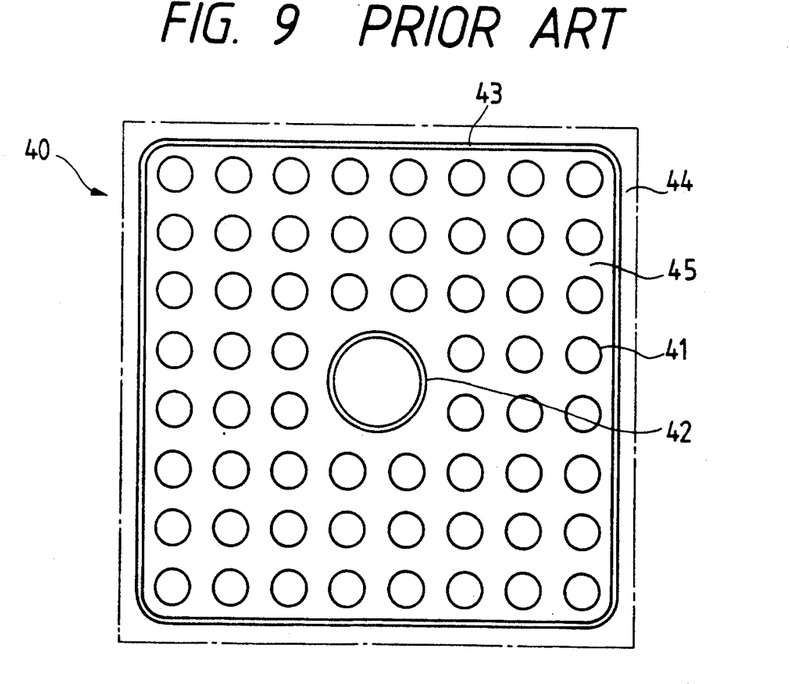
FIG. 9 is a horizontal sectional illustration of a fuel assembly of prior art.

A horizontal cross section of a fuel assembly 40 of prior art which achieves discharge burn up of approximately 38 GWd/t is illustrated in FIG. 9. A fuel assembly 40 comprises a plurality of fuel rods 41 and a water rod 42. A channel box 43 encloses the fuel rods 41 and the water rod 42. At a nuclear reactor being operated under a rated output (100% of the nuclear reactor output), about 90% of coolant flows inside of the channel box 43, and the rest, nearly 10%, of coolant leaks to a bypath region outside of the channel box 43, namely a water gap region 44. Generally speaking, coolant in the water rod 42 and the water gap region 44 is saturated water, and void fraction is 0%. When spectral shift operation is performed by altering coolant flow rate in a reactor core, the void fraction is changeable only in a region 45 where boiling water flows inside of the channel box 43.

Figure 10:
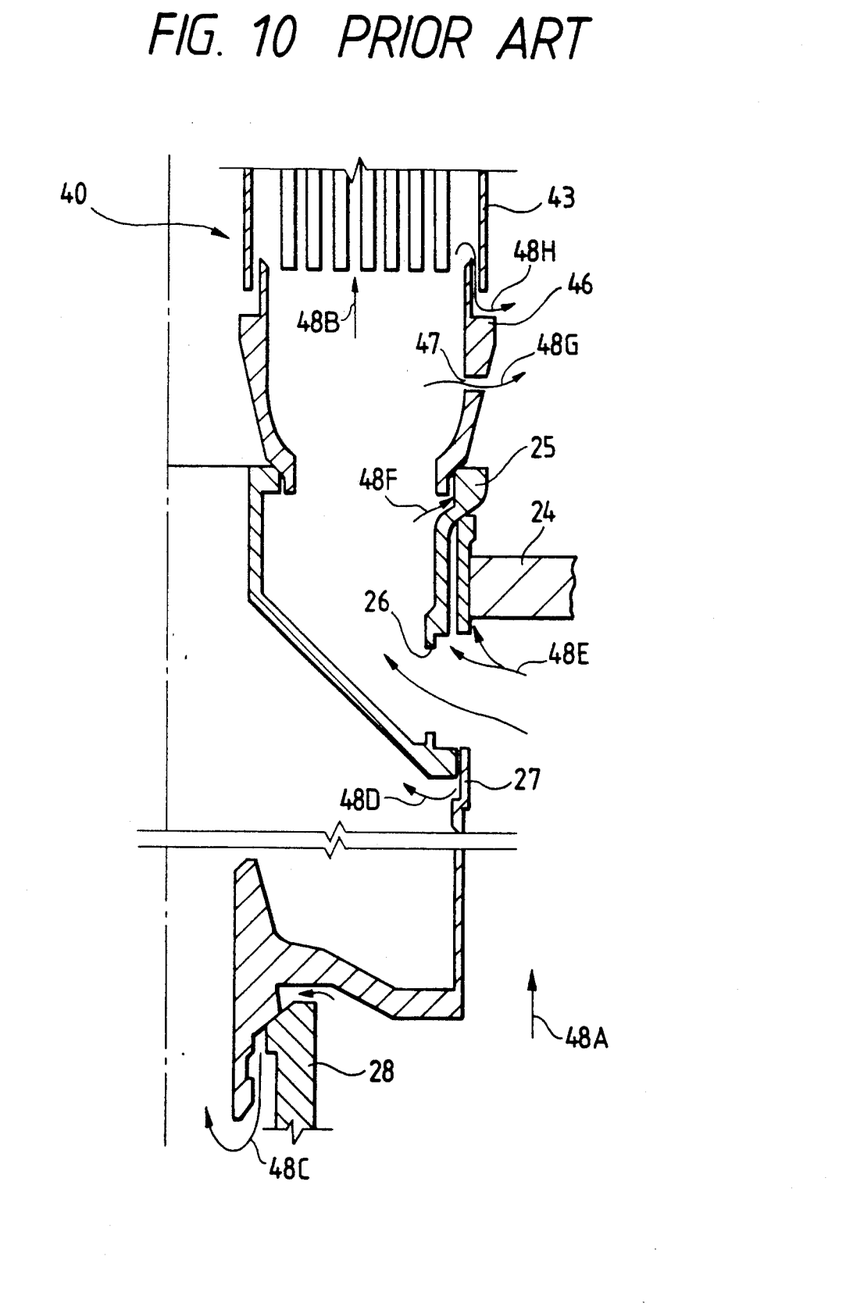
FIG. 10 is a vertical sectional illustration to indicate the structure of the fuel assembly of FIG. 9 in a nuclear reactor and the lower portion of the reactor core.

In FIG. 10, the fuel assembly 40 in the nuclear reactor and coolant flow at the lower portion are illustrated. In the figure, members corresponding to the members in FIG. 7 have same reference numerals respectively. At the lower tie plate 46 of the fuel assembly 40, the leak hole to leak a portion of the effective current of the coolant to the water gap region 44 is installed at adjacent two side planes of same side respectively in view of heat removal of in-core instrumentation tube 13 (refer to FIG. 4).

In whole coolant 48A which flows into the reactor core from bottom of the reactor core, the rate of the effective current 48B which flows inside of the fuel assembly 43 is about 90% as described above. The rest, 10%, of coolant can be divided into a current of coolant 48C which mainly flows through a gap between the control rod guide tube 27 and the housing of control rod drive 28, a current of coolant 48D which flows through a gap between the control guide tube 27 and the fuel support fittings 25, a current of coolant 48E which flows through a gap between the reactor core support plate 24 and the fuel support fittings 25, a current of coolant 48F which flows through a gap between the lower tie plate 46 and the fuel support fittings 25, a current of coolant 48G which flows through the leak hole 47 at the side plane of the lower tie plate, and a current of coolant 48H which flows through a gap between the lower tie plate 46 and the channel box 43. Among the current of coolant described above, the largest fraction to the whole leakage current of coolant is occupied by the current which flows through the leak hole 47 at the side plane of the lower tie plate, and approximately 60% of whole leakage current is occupied.

The fuel assembly 1 in the present embodiment has an orifice 11 which is installed at the leakage hole 47. The orifice coefficient, $K_{or}$, of the orifice 11 is, an indicated in FIG. 8, $K_{or} \approx 77$ at $Re = 34 \times 10^4$ when the reactor core flow rate is 85% at beginning of an operation cycle, and $K_{or} \approx 60$ at $Re = 45 \times 10^4$ when the reactor core flow rate is 110% at the end of the operation cycle. That means, by altering the reactor core flow rate in a range of 85~110%, the Reynolds Number of coolant which flows through the orifice can be changed by about 30% and the orifice coefficient can be changed by about 22%.

Accordingly, by setting the shape of the orifice which is indicated in FIG. 6A so as to make the coolant flow rate, which flows through the orifice 11 at 110% of the reactor core flow rate, same as the coolant flow rate which flows through the leakage hole 47 at the side plate of the lower tie plate under the operation of rated output of the nuclear reactor of prior art in which the fuel assemblies 40 are loaded, coolant leak flow rate to the water gap region 12 at 85% of the reactor core flow rate can be reduced by about 20%. Therefore, flow rate of the whole leak current at beginning of the operation cycle can be reduced at least 10%. As a result, the effective current in the channel box 6 (48B in FIG. 10) increases at beginning of the operation cycle and thermal margin to the limit of output increases, and hence, lower limit of the reactor core flow rate to the rated output of the nuclear reactor can be lowered about 2% by the present embodiment. That means the average of the atomic ratio of hydrogen to uranium (H/U ratio) of the reactor core can be decreased by the present invention in comparison with the case using the fuel assembly 40.

On the other hand, flow rate of the coolant which flows through the water gap region 12 decreases at least 10% of the conventional flow rate of the coolant in the water gap region 44. Therefore, void fraction in the water gap region 12 increases by heat which is generated by (n, γ) reaction of neutron which is yielded in the reactor core.

With both effects of decreasing of flow rate in the reactor core and void generation in the water gap region 12, the H/U ratio in the present invention can be reduced by 0.05 in comparison with the case using the fuel assembly 40. Comparison of the result with change of H/U ratio, 0.3, which is caused only by alteration of the flow rate of the reactor core, reveals that change of H/U ratio increases about 17%. And, by making the H/U ratio at the beginning of the operation cycle small, the neutron spectrum becomes harder and the resonance absorption reaction of neutron by parents nuclides such as uranium 238 etc. is increased, and hence, excess reactivity is decreased and conversion ratio is increased, and the effect of the spectral shift operation is improved.

In the present invention, as the void fraction in the water gap region 12 becomes large at the beginning of the operation cycle, yield of plutonium 239 in the fuel rods locating at outer peripheral portion of the fuel assembly 1, especially at the most outer row, becomes larger. And, as the void fraction in the water gap region 12 becomes small (essentially void fraction is zero) at the end of the operation cycle, moderating effect of neutron in the water gap region 12 is increased remarkably. Therefore, nuclear fission in the fuel rod locating at outer peripheral portion, especially at the most outer row of the fuel assembly where plutonium is accumulated much is activated, and the peaking factor at the outer peripheral portion in the cross section of the fuel assembly 1 becomes larger. As described above, the present embodiment is able to form the peaking at the outer peripheral portion by utilizing plutonium 239, which is accumulated by the spectral shift operation, at the end of the operation cycle, and therefore, reactivity gain becomes larger.

Figure 12:
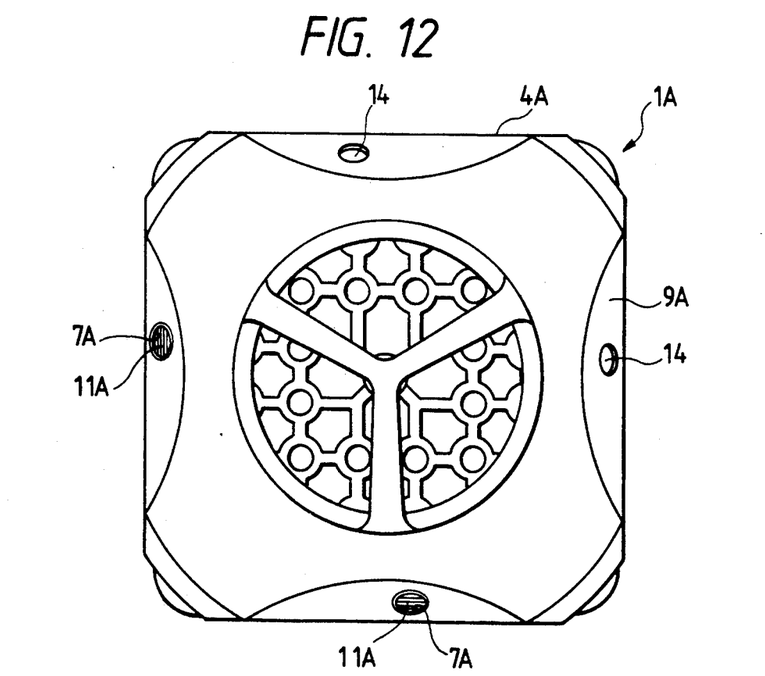
FIG. 12 is a view of a lower tie plate which is seen upwards from the bottom of the fuel assembly of the second embodiment of the present invention.

A spectral shift to alter the void fraction of an internal portion of a fuel assembly, not an external portion of the fuel assembly, as the fuel assembly shown in FIG. 12 of EP-A-0205162 does not cause the effect which is described in the present embodiment, and the increment of reactivity gain is small in comparison with the present embodiment.

A method to alter void fraction in a water gap region, which was disclosed in JP-A-60-177293 (1985), has large reactivity gain with the same reason.

Figure 16:
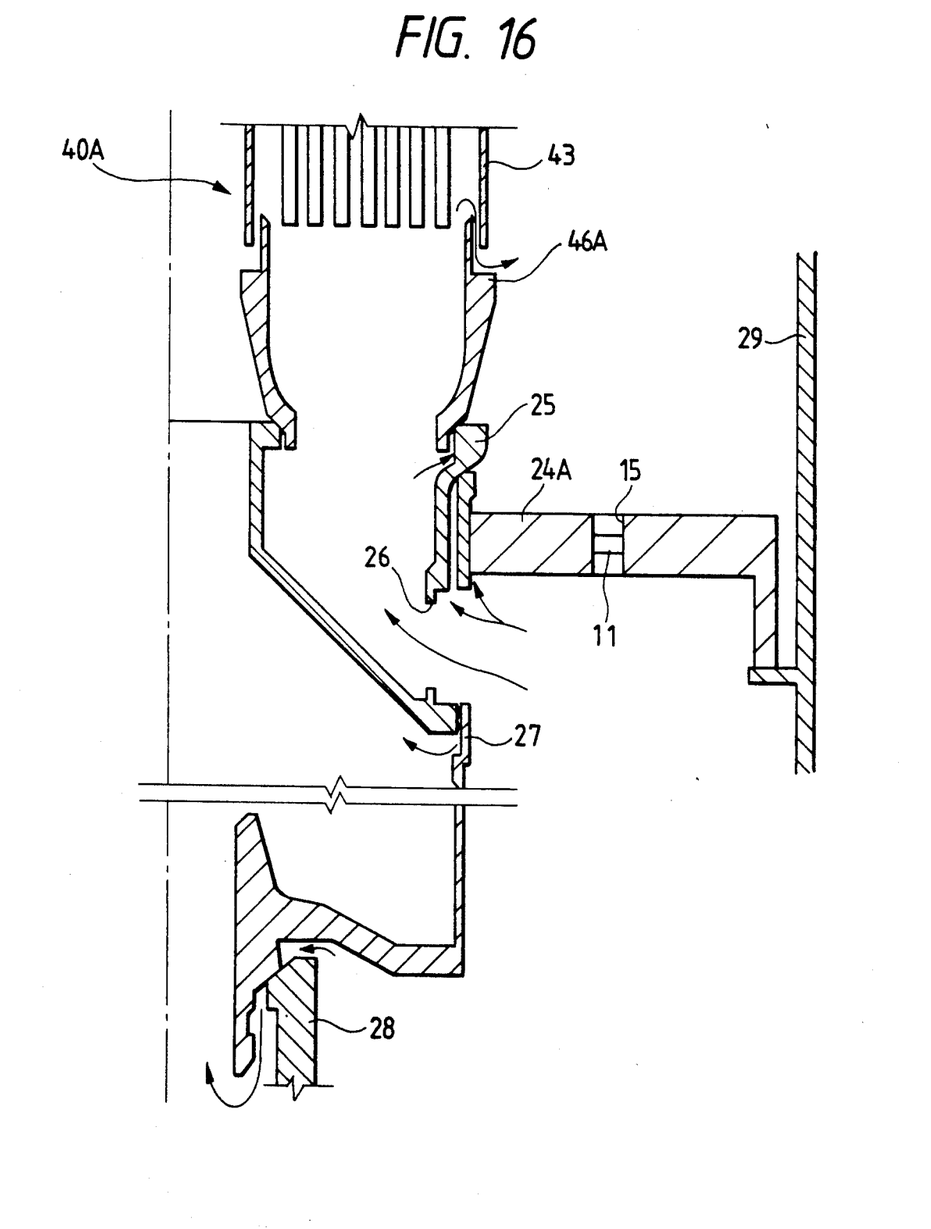
FIG. 16 is a vertical sectional illustration to indicate the structure of lower portion of the reactor core of the fourth embodiment of the present invention.

The present embodiment is compared with another embodiment of the present invention which is shown in FIG. 16.

The present embodiment in which the orifice 11 is installed at the lower tie plate of the fuel assembly flows more coolant into the channel box than the other embodiment in which the orifice 11 is installed at the reactor core support plate 24 at the beginning of an operation cycle. Therefore, the present embodiment increases thermal margin of the fuel assembly at the beginning of the operation cycle more than that of the other embodiment. At the beginning of the operation cycle, maximum linear heat generation is large and, even though it may be within an allowable limit, thermal margin of the fuel assembly is small as indicated in FIG. 10 of JP-A-2-157689 (1990). The present embodiment is able to improve the problem described above. The reason that the present embodiment yields the effect described above is that each of leak current of coolant of 48D, 48E, and 48F is not existing in down stream side of the orifice 11 in the present embodiment, while each of the leak current of coolant of 48D, 48E, 48F, and 48H is existing in down stream side of the orifice 11 in the other embodiment described above. Further, each of the leak current of coolant, 48D, 48E, and 48F, in upper stream side of the orifice 11 in the present embodiment is less than each of the leak current of coolant, 48D, 48E, and 48F, in down stream side of the orifice 11 in the other embodiment shown in FIG. 16. The same thing is able to be said between the present embodiment and JP-A-60-177293 (1985).

And, as the flow rate of coolant which flows into the channel box 43 in a case, when the flow rate in the reactor core is decreased by loss of coolant, is increased relatively in the present embodiment, the safety margin is also increased.

Figure 11:
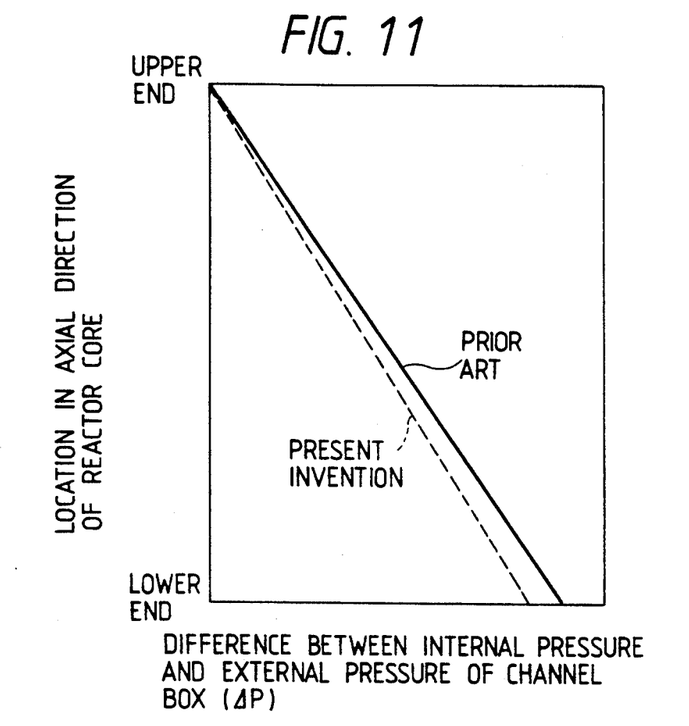
FIG. 11 is a characteristic graph to indicate change of pressure difference between internal pressure and external pressure of the channel box depending on location in axial direction of the reactor core.

Further, generally speaking, structures such as the fuel rods and the spacers etc. to be obstacles to the coolant flow are existing in the channel box of fuel assembly for the boiling water reactor and, moreover, pressure loss of two phase flow portion is yielded by boiling of coolant, therefore, internal pressure of the channel box is higher than pressure in the water gap region at the lower end portion of the reactor core (about 10 psi). In FIG. 11, dependance of the pressure difference ($\Delta P$) between the internal portion and external portion of the channel box 40 of prior art on location in axial direction of the reactor core is indicated by a solid line. A load from inside toward outside is added on the side plane of the channel box as a result of the difference of the pressure, and the load becomes a source of bulging of the channel box. The bulging of the channel box has a possibility to cause problems such as reduction of clearance between the channel box and the control rod at the insertion of the control rod, and also as contact of the channel boxes each other.

In the present embodiment, as void is generated in the water gap region 12 when flow rate of coolant is low at the first half of an operation cycle and pressure loss of the portion of two phase current is caused, the difference of pressure between the internal portion and external portion of the channel box is reduced as indicated by a broken line in FIG. 11. Therefore, bulging toward outside of the channel box can be reduced.

As explained above, the present embodiment is able to raise the effect of the spectral shift operation with using the orifice 11 which does not have any mobile member, and consequently, high reliability under neutron irradiation condition can be insured. Further, the safety margin at loss of coolant is improved.

And, as the bulging of the channel box 6 can be reduced when the flow rate of coolant in the reactor core is small at the first half of the operation cycle, the possibility to cause the contact between the channel box 6 and the control rod 23 or the contact of the channel boxes 6 each other is reduced, and hence, safety is improved.

Further, as the fuel assembly 1 having the orifice 11 can be replaced after using of a scheduled several operation cycles, the fuel assembly 1 is applicable easily to a conventional nuclear reactor, and moreover, the application can be achieved with small change of lower tie plate and is economically advantageous.

EMBODIMENT 2

Figure 13:
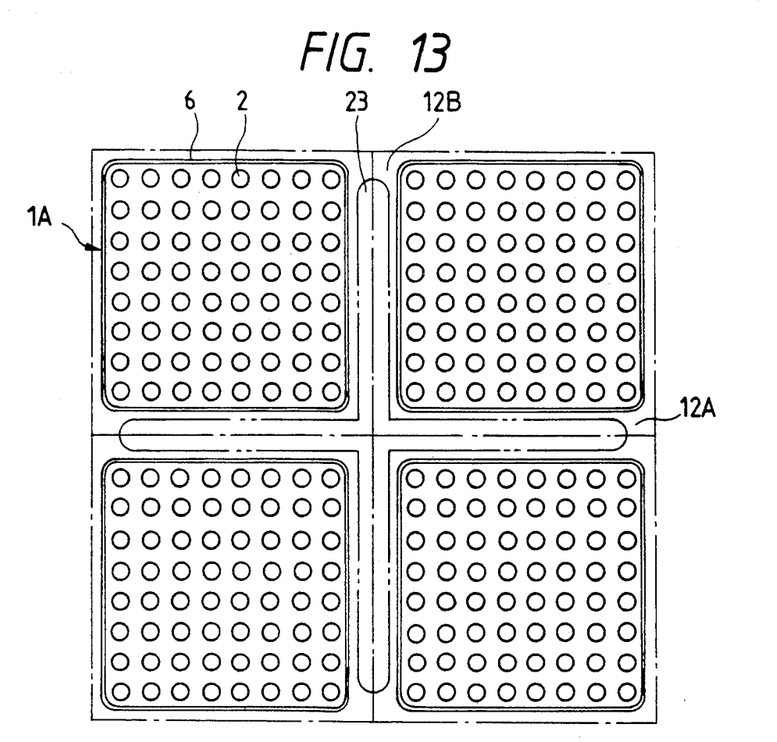
FIG. 13 is a horizontal sectional illustration indicating of a state that the fuel assemblies of FIG. 12 are loaded in a D-lattice reactor core.

The second embodiment of the present invention is explained with using FIGS. 12 and 13. The present embodiment is relating to a fuel assembly which is loaded into a D-lattice reactor core.

In FIG. 12, a through hole 7A is provided similarly to the embodiment 1 at each of adjacent side walls 9A of a lower tie plate 4A of the fuel assembly 1A respectively, and an orifice 11A of which the coefficient of pressure loss is depending on the flow rate of coolant is installed at each of the adjacent through holes 7A respectively. At each of reverse side of the adjacent side walls 9A of the lower tie plate 4A, conventional leak holes 14 are provided. The orifice 11A has the same structure with the orifice 11.

The fuel assembly 1A is used in the D-lattice reactor core. The D-lattice reactor core is defined as a reactor core in which the fuel assemblies are arranged so as to make a water gap region 12A (wide gap) at a side where a control rod 23 is inserted wider than the reverse water gap region 12B (narrow gap) as shown in FIG. 13. In FIG. 12, the orifices 11A are installed at side walls of the wide gap 12A sides of the lower tie plate 4A, and the leak holes 14 are provided at side walls of the narrow gap 12B sides of the lower tie plate 4A.

In the conventional boiling water reactor having the D-lattice reactor core, saturated water flows the water gap region. In the case described above, the flow rate of coolant in the wide gap 12A side is more than the flow rate of coolant in the narrow gap 12B side, and the distribution of neutron flux is biased toward the wide gap 12A side. As the result, imbalance in elongation of the channel box by neutron irradiation is occurred, hence bowing of the channel box is caused.

In the present embodiment, the orifice 11A is installed at side wall of the wide gap 12A side, and the leak hole 14 is provided at side wall of the narrow gap 12B side. Therefore, at first half of an operational cycle when the flow rate of coolant is small, the flow rate of coolant which leaks to the wide gap side becomes smaller than the flow rate of coolant which leaks to the narrow gap side. Consequently, void fraction in the wide gap is increased and density of hydrogen atom number becomes smaller. As a result, reduction of effective horizontal sectional area of the wide gap 12A is caused and the bias of the neutron flux described above is dissolved, hence bowing of the channel box 6 is reduced.

EMBODIMENT 3

Figure 14:
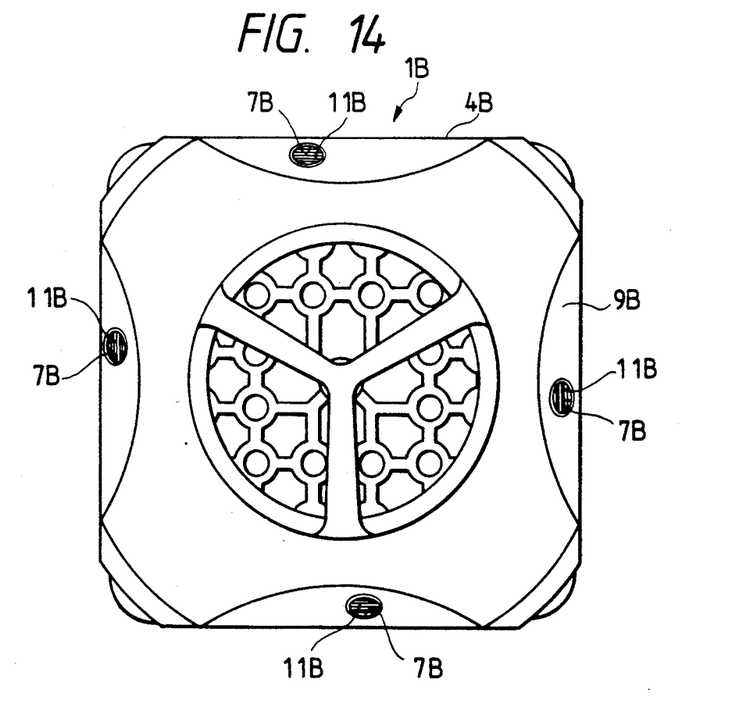
FIG. 14 is a view of a lower tie plate which is seen upwards from the bottom of the fuel assembly of the third embodiment of the present invention.
Figure 15:
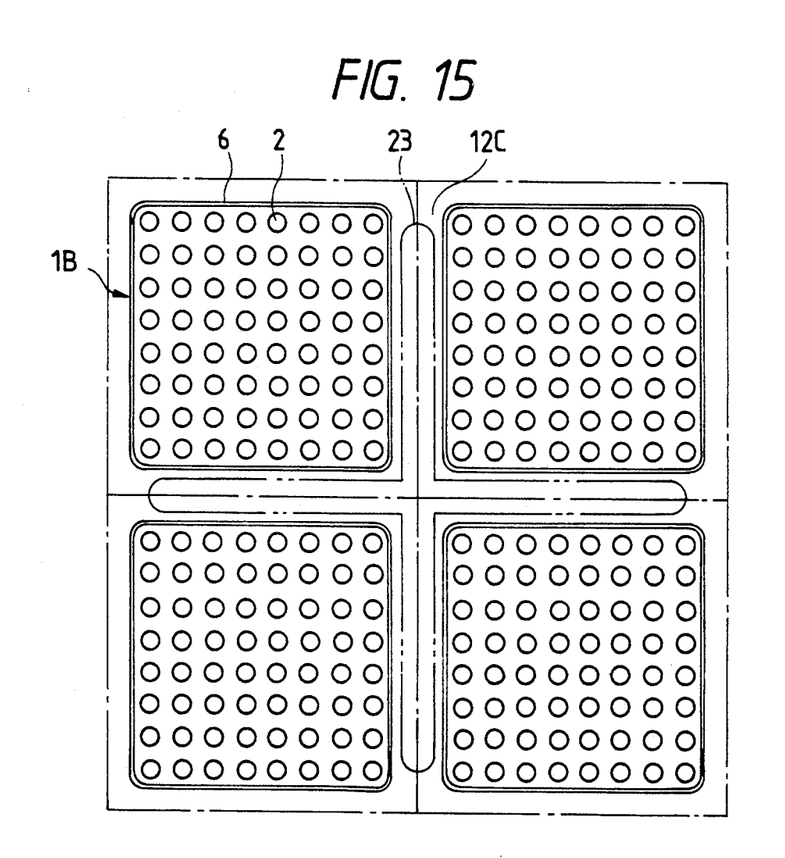
FIG. 15 is a horizontal sectional illustration indicating of a state that the fuel assemblies of FIG. 14 are loaded in a C-lattice reactor core.

The third embodiment of the present invention is explained with using FIGS. 14 and 15. The present embodiment is relating to a fuel assembly which is loaded into a C-lattice reactor core.

In FIG. 14, a through hole 7B is provided at each of all four side walls 9B of a lower tie plate 4B of the fuel assembly 1B as same as the embodiment 1, and an orifice 11B of which the pressure loss coefficient is depending on the flow rate is installed at each of all four through holes 7B. The orifice has the same structure with the orifice 11A.

The fuel assembly 1B is used in the C-lattice reactor core. The C-lattice reactor core is defined as a reactor core in which the fuel assemblies which are arranged so as to make width of all water gap regions 12C between the fuel assemblies 1B equal as shown in FIG. 15. Therefore, bias of the neutron flux distribution such as a case of the D-lattice reactor core is not existing. Accordingly, the orifice 11B of the same type is installed at each of all side wall of the lower tie plate 4B in the present embodiment.

By the present embodiment, ratio of the leak current which is controlable by the orifice 11 is increased in comparison with the embodiment 1, and consequently, the effect of the spectral shift operation can be increased.

EMBODIMENT 4

The fourth embodiment of the present invention is explained with using FIG. 16. In the drawing, the same reference numeral is used for the member as the reference numeral of the correspondent member in FIGS. 7 and 10. The present embodiment obtains an equivalent effect by installing of an orifice 11 at a portion of other than the lower tie plate 46A of the fuel assembly 40A. The fuel assembly 40A is a modified fuel assembly 40 which does not have any leak holes 47 at the lower tie plate 46A.

In FIG. 16, a leak hole 15 for coolant is provided at a reactor core support plate 24A, and an orifice 11, of which the pressure loss coefficient is depending on flow rate, is installed at the leak hole 15.

In the present embodiment, if the flow rate in a reactor core is reduced to less than the rated flow rate at the first half of an operation cycle, the pressure loss coefficient of the orifice 11 is increased and the flow rate of coolant in water gap region 12 is decreased, and consequently, void fraction in the water gap region 12 is increased by heating with (n, γ) reaction of neutrons which are generated in the reactor core. Further, effective current of coolant which flows into the channel box 43 is increased and thermal margin is improved, hence the flow rate in the reactor core can be reduced. As a result, the average H/U ratio of reactor core becomes smaller and neutron spectrum becomes harder, and consequently, resonance absorption reaction of neutron by parent nuclides such as uranium 238 etc. is increased and conversion ratio is raised together with reduction of excess reactivity, and the effect of spectral shift operation is enhanced. The orifice 11 does not have any mobile member.

And, as same as the embodiment 1, even though the flow rate of coolant in the reactor core is reduced when loss of coolant is occurred, the ratio of the flow rate of coolant to the channel box is relatively increased, hence the safety margin is improved. Further, as bulging of the channel box 43 can be reduced during a period of small flow rate at the first half of the operation cycle, possibility to cause contact between the channel box and a control rod or the channel boxes mutually is reduced and safety is improved.

Although preferable embodiments of the present invention are explained as above, the embodiments can be modified in various manner within spirit of the present invention. For example, as the present invention uses simple structure with minor modification on the lower tie plate of the fuel assembly or the reactor core support plate, the present invention can be executed in combination with other prior art such as a spectral shift rod which is disclosed in JP-A-63-73187 (1988) (EP-A-0282600), JP-A-1-176982 (1989) etc. In the case described above, as controlable width of the flow rate in reactor core can be spread wide by application of the present invention, the variation of liquid column in the spectral shift rod during operation is increased, and larger effects of the spectral shift can be obtained.

And, as explained in referring to FIG. 10, leak currents, 48C~48E and 48H, the flow into the water gap region from portions other than the leak hole at the lower tie plate additionally. Therefore, reduction of the flow rate of the leak current enhances more the effect of the present invention. For example, adoption of a structure which seals a gap between the lower tie plate 4 and the fuel support fittings 25 reduces flow rate of the leak current 48F, and larger effect of the spectral shift operation can be obtained.

What is claimed is:

1. A fuel assembly comprising
   a plurality of fuel rods in which nuclear fuel material is contained hermetically, a lower tie plate, which holds a lower end of the fuel rods and has a coolant flow path formed inside for leading the coolant to a gap between said fuel rods, and a channel box which encloses a bundle of said fuel rods:

characterized in a means of resistance, of which pressure loss coefficient is dependent on flow velocity of the passing coolant, installed in a through hole which is provided at a side wall of the lower tie plate to lead a portion of coolant to outside of said fuel assembly from the coolant flow path in the lower tie plate without supplying the portion of coolant to the gap between said fuel rods by connecting to the lower tie plate.

2. A fuel assembly as claimed in claim 1, wherein said means of resistance have a plurality of coolant flow paths in which a throat portion is formed respectively, and cross sectional area of each of the coolant flow paths increases continuously from the throat portion toward both of upper stream side and down stream side, and encountered side walls of the coolant flow path are formed with continuous smooth planes from the upper stream side to the down stream side of the throat portion.

3. A fuel assembly as claimed in claim 2, wherein said means of resistance comprises a plurality of resistant members, and a plurality of the coolant flow paths are formed between the adjacent resistant members mutually, and the encountered side walls of the coolant flow path are a surface of the resistant members.

4. A fuel assembly as claimed in claim 3, wherein the resistant members are round rods.

5. A fuel assembly as claimed in claim 1, wherein the side wall of the lower tie plate has four side planes, and said means of resistance are installed at two side planes, which are adjacent to the same corner portion, out of the four side planes.

6. A fuel assembly as claimed in claim 1, wherein the side wall of the lower tie plate has four side planes, and said means of resistance are installed at two side planes, which are adjacent to the same corner portion, out of the four side planes, while said means of resistance is not installed in the through hole at each of other two side planes.

7. A lower tie plate comprising a fuel supporting portion to support lower end of a plurality of fuel rods, and a cylindrical side wall portion, in which a coolant flow path is formed, connecting to the fuel supporting portion:

characterized in a means of resistance, of which pressure loss coefficient is dependent on velocity of passing coolant, installed in a through hole, which is provided at the side wall, to lead a portion of coolant from the coolant flow path to outside of the lower tie plate by connecting to the side wall.

8. A lower tie plate as claimed in claim 7, wherein said means of resistance have a plurality of coolant flow paths in each of which a throat portion is formed, and cross sectional area of each of the coolant flow paths increases continuously from the throat portion toward both of upper stream side and down stream side, and encountered side walls of the coolant flow path are formed with continuous smooth planes from the upper stream side to the down stream side of the throat portion.

9. A reactor core of a boiling water reactor comprising a plurality of fuel assemblies each of which comprises a plurality of fuel rods which contain nuclear fuel material inside hermetically, a lower tie plate holding a lower end of the fuel rods, in which a coolant flow path to lead coolant to a gap between the fuel rods is formed inside, and a channel box which encloses a bundle of the fuel rods, wherein the fuel assemblies are arranged to form a gap region to flow the leak current between each of adjacent fuel assemblies, characterized in a means of resistance, in which coolant flow from the lower tie plate to the gap region flows through inside and of which pressure loss coefficient is dependent on velocity of passing coolant, installed at the side wall of the lower tie plate.

10. A reactor core of a boiling water reactor as claimed in claim 9, wherein said means of resistance have a plurality of coolant flow paths in which a throat portion is formed, and cross sectional area of each of the coolant flow paths increases continuously from the throat portion toward both of upper stream side and down stream side, and encountered side walls of the coolant flow path are formed with continuous smooth planes from the upper stream side to the down stream side of the throat portion.

11. A reactor core of a boiling water reactor as claimed in claim 10, wherein said means of resistance comprises a plurality of resistant members, and a plurality of the coolant flow paths are formed between the adjacent resistant members mutually, and the encountered side walls of the coolant flow path are a surface of the resistant members.

12. A reactor core of a boiling water reactor as claimed in claim 9, wherein said gap region includes the first gap region and the second gap region which locates at a cross point with the first gap region, the second gap region being wider than the first gap region, and each of the fuel assemblies are arranged so as to touch a portion of the side plane to the first gap region and to touch the rest portion of the side plane to the second gap region, and a through hole which leads coolant from inside of the lower tie plate to the first gap region is provided at the side plane of the lower tie plate which faces to the first gap region, and said means of resistance is installed at the side plane of the lower tie plate which faces to the second gap region.

13. A nuclear reactor comprising
a reactor vessel,
a plurality of fuel assemblies which are loaded in a reactor core in the reactor vessel, and
a reactor core support plate to support the fuel assembly,
characterized in
a means of resistance, in which coolant flow from the lower portion than the reactor core support plate to the gap region flows through inside and of which pressure loss coefficient is dependent on velocity of passing coolant, installed at the reactor core support plate.

14. A nuclear reactor as claimed in claim 13, wherein said means of resistance have a plurality of coolant flow paths in which a throat portion is formed, and cross sectional area of each of the coolant flow paths increases continuously from the throat portion toward both of upper stream side and down stream side, and
encountered side wall of the coolant flow path are formed with continuous smooth planes from the upper stream side to the down stream side of the throat portion.

15. A nuclear reactor as claimed in claim 14, wherein said means of resistance comprises a plurality of resistant members, and
a plurality of the coolant flow paths are formed between the adjacent resistant members mutually, and
the encountered side walls of the coolant flow path are surface of the resistant members.

* * * * *